US009488023B2

(12) United States Patent
Vogt et al.

(10) Patent No.: US 9,488,023 B2
(45) Date of Patent: Nov. 8, 2016

(54) BLOWOUT PREVENTER STORAGE, TRANSPORT AND LIFT SKID ASSEMBLY

(71) Applicant: Woolslayer Companies, Inc., Tulsa, OK (US)

(72) Inventors: Dewayne Vogt, Tulsa, OK (US); Shelby Heidemann, Tulsa, OK (US)

(73) Assignee: Woolslayer Companies, Inc., Tulsa, OK (US)

( * ) Notice: Subject to any disclaimer, the term of this patent is extended or adjusted under 35 U.S.C. 154(b) by 0 days.

(21) Appl. No.: 14/718,284

(22) Filed: May 21, 2015

(65) Prior Publication Data

US 2015/0377409 A1 Dec. 31, 2015

Related U.S. Application Data

(60) Provisional application No. 62/017,976, filed on Jun. 27, 2014.

(51) Int. Cl.
| | |
|---|---|
| *E21B 33/03* | (2006.01) |
| *F16M 1/00* | (2006.01) |
| *E21B 41/00* | (2006.01) |
| *E21B 33/06* | (2006.01) |

(52) U.S. Cl.
CPC ............... *E21B 33/03* (2013.01); *E21B 33/06* (2013.01); *E21B 41/00* (2013.01); *F16M 1/00* (2013.01)

(58) Field of Classification Search
CPC ......... F16M 1/00; E21B 33/03; E21B 41/00; E21B 33/06; E21B 19/00
USPC ....... 248/647; 166/76.1, 79.1, 379; 414/642, 414/666, 672
See application file for complete search history.

(56) References Cited

U.S. PATENT DOCUMENTS

| | | | | |
|---|---|---|---|---|
| 2,872,052 | A * | 2/1959 | Ferguson | B62B 3/0625 254/9 R |
| 3,158,213 | A * | 11/1964 | O'Neill | E21B 19/20 175/52 |
| 4,359,089 | A * | 11/1982 | Strate | E21B 33/06 166/383 |
| 4,821,816 | A * | 4/1989 | Willis | E21B 15/00 175/57 |
| 5,121,793 | A * | 6/1992 | Busch | E21B 33/02 166/79.1 |
| 5,388,930 | A * | 2/1995 | McNease | B63B 27/02 405/196 |
| 6,594,960 | B2 | 7/2003 | Brittain et al. | |
| 6,821,071 | B2 | 11/2004 | Woolslayer et al. | |
| 6,902,007 | B1 * | 6/2005 | Orr | E21B 33/06 166/379 |
| 7,040,411 | B2 * | 5/2006 | Kainer | E21B 19/00 166/379 |
| 8,112,946 | B2 | 2/2012 | Vogt | |
| 8,250,826 | B1 | 8/2012 | Vogt | |
| 8,353,132 | B1 | 1/2013 | Vogt et al. | |
| 8,371,790 | B2 * | 2/2013 | Sigmar | E21B 19/10 414/22.55 |
| 8,381,480 | B2 | 2/2013 | Vogt et al. | |
| 8,469,648 | B2 * | 6/2013 | Orgeron | E21B 19/155 414/22.55 |

(Continued)

*Primary Examiner* — Anita M King
(74) *Attorney, Agent, or Firm* — Head, Johnson & Kachigian, P.C.

(57) ABSTRACT

A storage, transport and lift skid assembly for a blowout preventer. The assembly includes a base frame and a mounting frame movable between a storage and transport position parallel to the base frame and an installation position perpendicular to the base frame. An adjustable blowout preventer cradle retains the blowout preventer in the mounting frame. At least one pivot pin permits rotation of the mounting frame with respect to the base frame. A plurality of flange locks are adjustably connected to the mounting frame to secure to the blowout preventer. At least one actuator mechanism moves the mounting frame between the storage and transport position and the installation position.

17 Claims, 7 Drawing Sheets

(56) References Cited

U.S. PATENT DOCUMENTS

| | | |
|---|---|---|
| 8,720,128 B2 | 5/2014 | Vogt |
| 9,016,004 B2 | 4/2015 | Vogt |
| 9,353,593 B1 * | 5/2016 | Lu .......................... E21B 33/06 |
| 2003/0079883 A1 * | 5/2003 | McCulloch ............ B66C 19/00 166/379 |
| 2015/0068726 A1 | 3/2015 | Vogt |

* cited by examiner

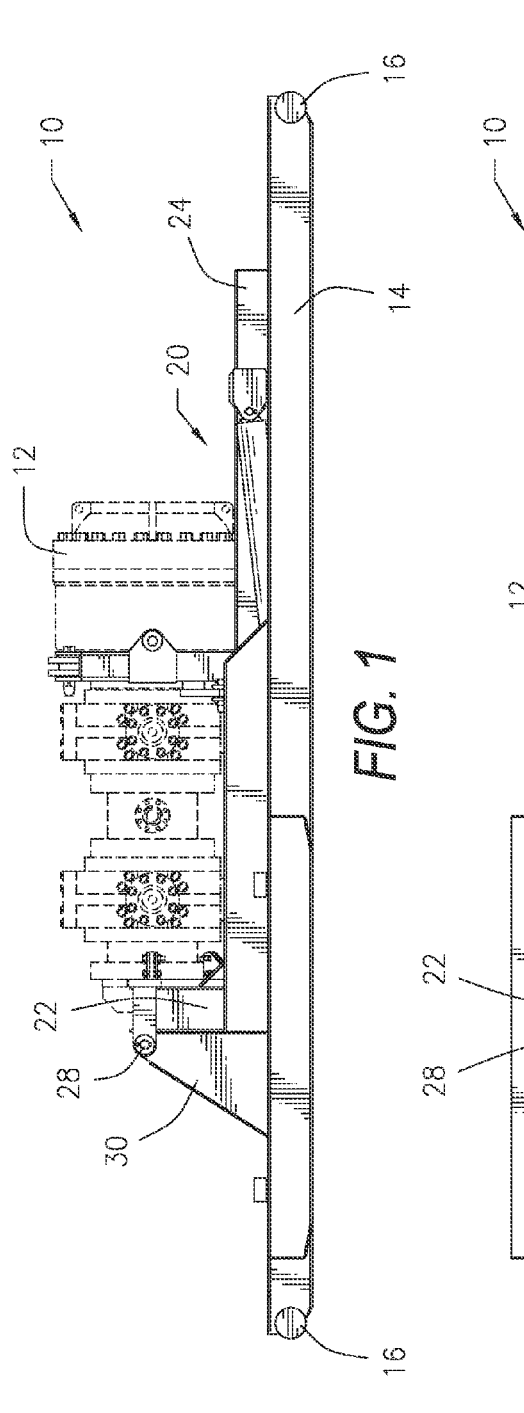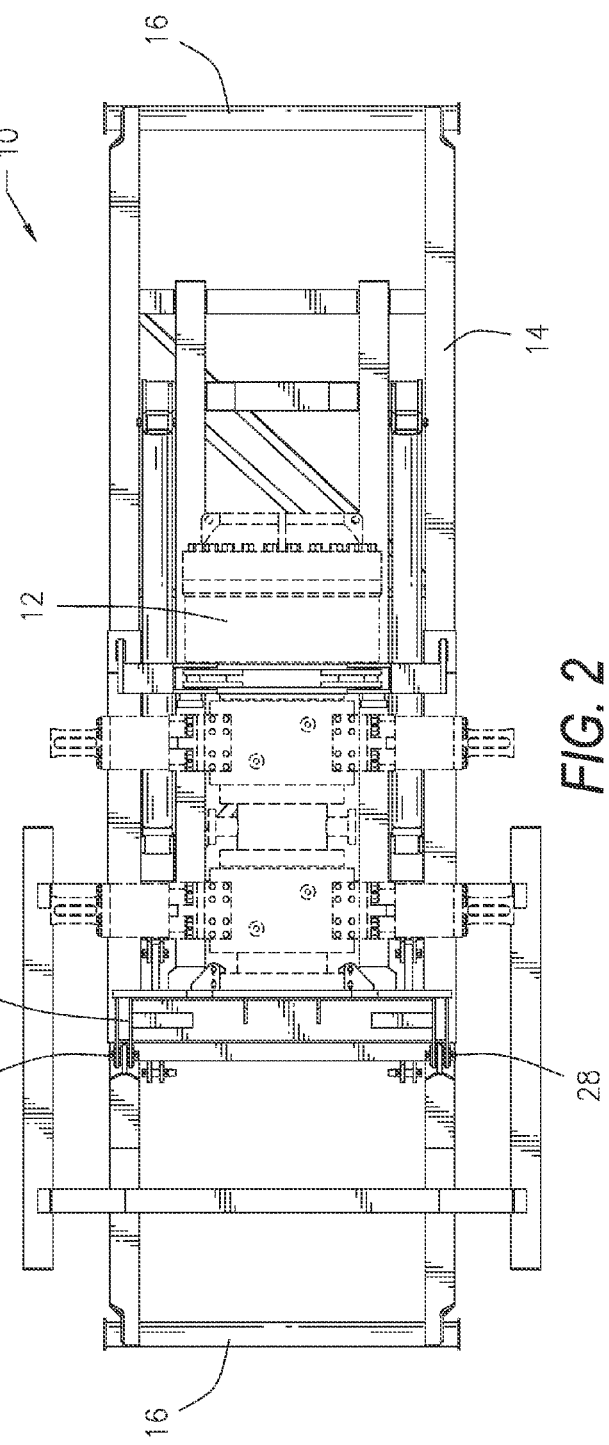

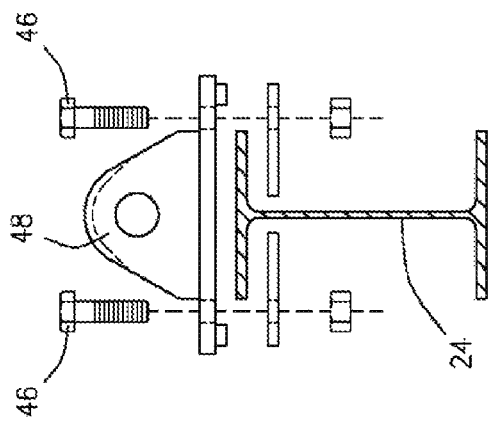
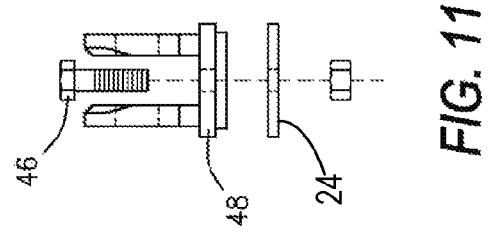
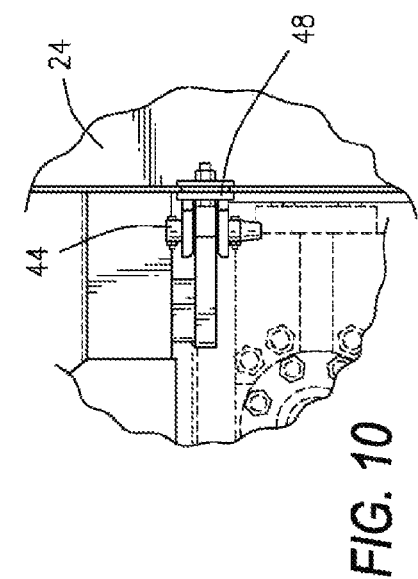
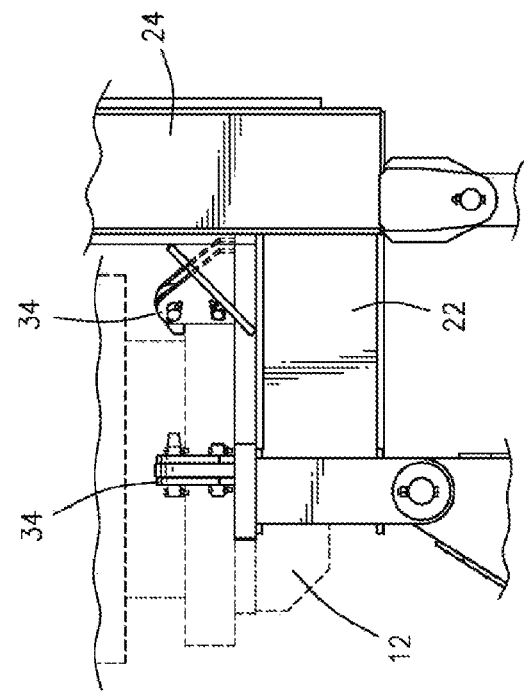
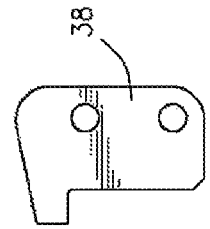
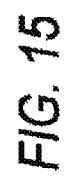

BLOWOUT PREVENTER STORAGE, TRANSPORT AND LIFT SKID ASSEMBLY

This application claims priority to U.S. Provisional Patent Application No. 62/017,976, filed Jun. 27, 2014, which is herein incorporated by reference.

BACKGROUND OF THE INVENTION

1. Field of the Invention

The present invention relates to a storage, transport and lift skid assembly for a blowout preventer.

2. Prior Art

Blowout preventers are known devices which are used with downhole exploration and production for oil and gas. Blowout preventers are typically installed at the surface of a well and are a series of valves and controls which are automatically implemented under certain conditions.

In the case of drilling exploration, a blowout preventer is transported to a desired drilling site and installed during assembly of the drilling rig. The blowout preventer may be transported to the drilling site on a flatbed trailer. After the drilling operation has been completed, the entire rig is disassembled and all of the equipment is transported to another location.

Blowout preventers may be located and placed in various locations over a well center line. In some operations, the blowout preventer is located over the well center line, above a sub base structure of the well rig and below a spaced drill or rig floor.

In at least one configuration, the blowout preventer is installed at the surface of the wellhead beneath the drilling platform which is spaced above and parallel to the ground surface. Accordingly, the blowout preventer is transported to the site, moved from a horizontal position to a vertical position and then connected to the well. Thereafter, it may be necessary to disassemble the entire rig and move all of the components. The blowout preventer may be moved and transported in and out of position over the well head as seen in Applicant's co-pending U.S. patent application Ser. No. 14/023,943 (Pat. Publ. No. 2015/0068726) entitled Blowout Preventer Transport and Handling System, which is incorporated herein by reference.

Different blowout preventers have different configurations such that the height will vary depending on the chosen blowout preventer. Additionally, the width or circumferential dimensions will vary depending on the selected blowout preventer.

Accordingly, it would be desirable to provide a combination storage, transport and lift skid assembly for a blowout preventer which would facilitate storage and transportation to and from a well site.

It would also be desirable to provide a storage, transport and lift skid assembly for a blowout preventer that would translate the blowout preventer between a horizontal storage and transport position and a vertical installation position.

It would also be desirable to provide a storage, transport and lift skid assembly for a blowout preventer that would accommodate various sizes and various dimensions of blowout preventers.

It would also be desirable to provide a storage, transport and lift skid assembly for a blowout preventer that would provide an adjustable cradle attachable to the blowout preventer wherein the cradle would be used to lift the blowout preventer from the assembly.

SUMMARY OF THE INVENTION

The present invention is directed to a storage, transport and lift skid assembly for a blowout preventer. The assembly includes a base frame in the form of a skid. A mounting frame receives the blowout preventer thereon. The mounting frame includes a base portion and a back portion substantially perpendicular thereto.

A pair of pivot pins pass through the base portion of the mounting frame and through a pair of upstanding legs extending from the base frame to form an axis of rotation for the mounting frame as it moves between a horizontal storage and transportation position and a vertical installation position.

An actuator mechanism moves the mounting frame between the storage and transport position and the installation position. A pair of hydraulic cylinders are each pivotally connected at one end to the base frame and pivotally connected at the opposed end to the back portion of the mounting frame.

A plurality of flange locks are attached to the base portion of the mounting frame and engage an annular base of the blowout preventer in order to secure the blowout preventer in position.

Once the mounting frame is raised to the vertical installation position, a pair of connecting links pivotally connected to the base portion of the mounting frame will be rotated into position and then pinned to the base frame in order to lock the mounting frame into the vertical position.

The assembly also includes an adjustable blowout preventer cradle which is adjustably connected to the back portion of the mounting frame. The cradle may be secured to the back portion by a pair of adjustable brackets, which are adjustably and removably connected to the back portion of the mounting frame.

The adjustable cradle surrounds the circumference of the blowout preventer. The cradle includes a pair of opposed projecting ears with each of the ears having an opening therethrough. A connecting mechanism will connect with each ear in order to lift the cradle with the blowout preventer therein.

The adjustable cradle also includes a gate which may be unpinned from the cradle and removed to permit insertion and removal from the blowout preventer.

BRIEF DESCRIPTION OF THE DRAWINGS

FIG. 1 illustrates a side view of a storage, transport and lift skid assembly constructed in accordance with the present invention with a blowout preventer (shown in dashed lines) installed thereon;

FIG. 2 illustrates a top view of a storage, transport and lift skid assembly shown in FIG. 1 with a blowout preventer (shown in dashed lines) installed thereon;

FIG. 10 is an enlarged view of a portion of FIG. 4 showing a bracket connecting the cradle to a mounting frame;

FIGS. 11 and 12 are exploded views of the bracket shown in FIG. 10;

FIG. 13 is an enlarged view of a portion of FIG. 4 showing flange locks that retain the blowout preventer; and FIGS. 14 and 15 illustrate alternate flange fingers for the flange locks.

Figure 3:
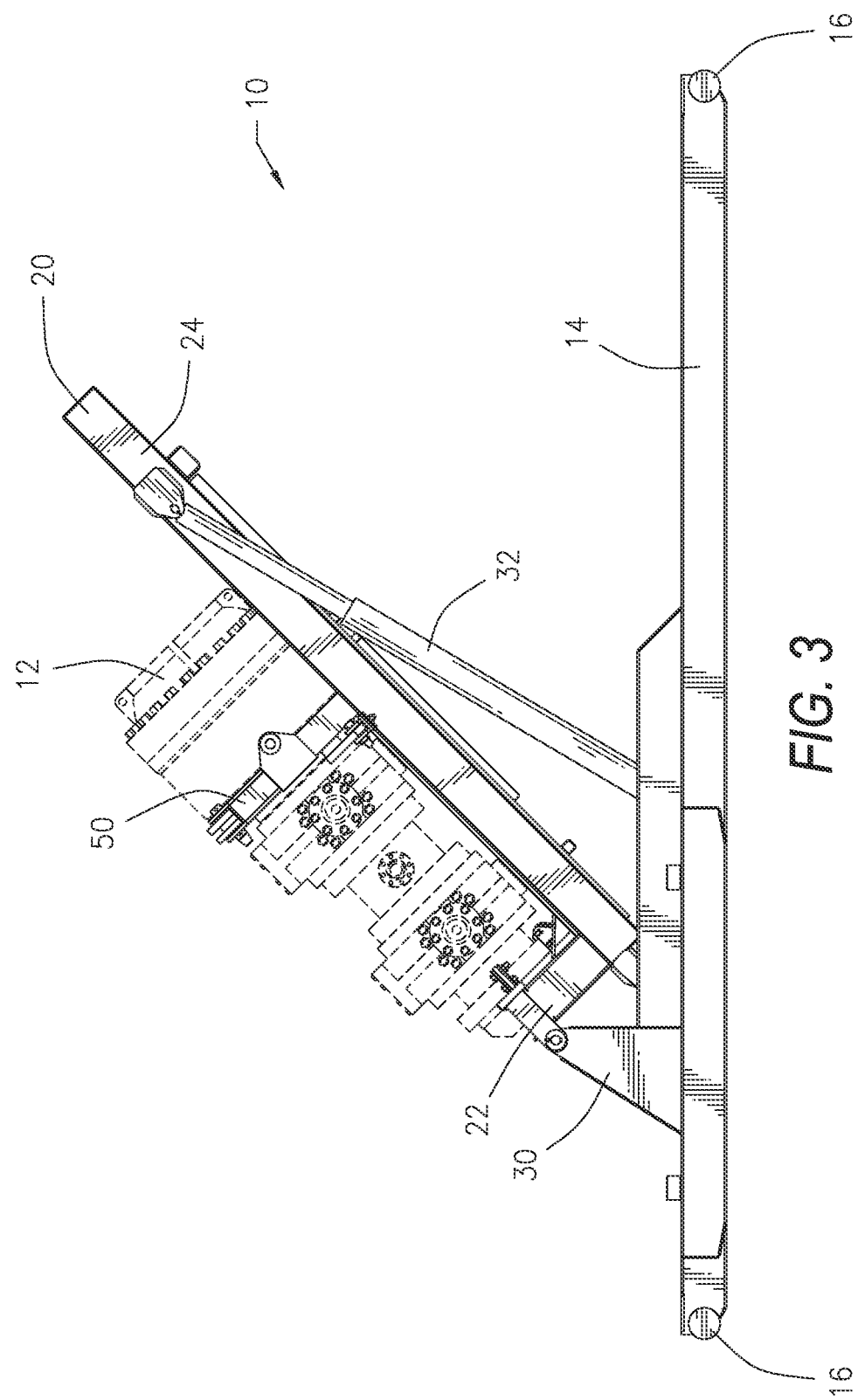
FIG. 3 illustrates a side view of the storage, transport and lift skid assembly partway between a horizontal storage and transportation position and a vertical installation position.

DETAILED DESCRIPTION OF THE
PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates a side view and FIG. 2 illustrates a top view of a storage, transport and lift skid assembly 10 with a blowout preventer 12 (shown in dashed lines) installed thereon. The present invention will work with a variety of types and sizes of blowout preventers, although the blowout preventer does not form a part of the invention.

The blowout preventer 12 is retained in and secured to the assembly 10 and is shown in a horizontal storage and transport position in FIGS. 1 and 2. The assembly 10 includes a base is frame 14. The base frame 14 may be in the form of a skid with a pair of opposed tail pipes 16 so that it may be receivable on a tractor trailer (not shown). The base frame 14 may be lifted or dragged and off a tractor trailer.

A mounting frame 20 receives the blowout preventer 12 therein. The mounting frame 20 is movable between a storage and transport position shown in FIGS. 1 and 2 substantially parallel to the base frame 14 and an installation position substantially perpendicular to the base frame 14. The mounting frame 20 includes a base portion 22 and a back portion 24 substantially perpendicular thereto. The back portion 24 may include a pair of I-beams parallel to each other.

At least one pivot pin permits rotation of the mounting frame 20 with respect to the base frame 14. In the present preferred embodiment, a pair of pivot pins 28 pass through the base portion 22 of the mounting frame 20 and through a pair of upstanding legs 30 extending upwardly from the base frame 14. The pivot pins 28 are aligned and, thus, form an axis of rotation for the mounting frame 20 as it moves between the horizontal storage and transportation position shown in FIGS. 1 and 2 and the vertical installation position.

FIG. 3 illustrates a side view of the assembly 10 partway between the horizontal storage and transportation position shown in FIGS. 1 and 2 and the vertical installation position.

An actuator mechanism moves the mounting frame 20 between the storage and transport position and the installation position. In the present preferred embodiment, a pair of hydraulic cylinders 32, each including an extending and retracting ram, are each pivotally connected at one end to the base frame 14 and pivotally connected at the opposed end to the back portion 24 of the mounting frame 20. As the rams extend, the mounting frame 20 is moved toward the vertical installation position. Conversely, as the rams retract, the mounting frame 20 is moved toward the horizontal storage and installation position.

Figure 4:
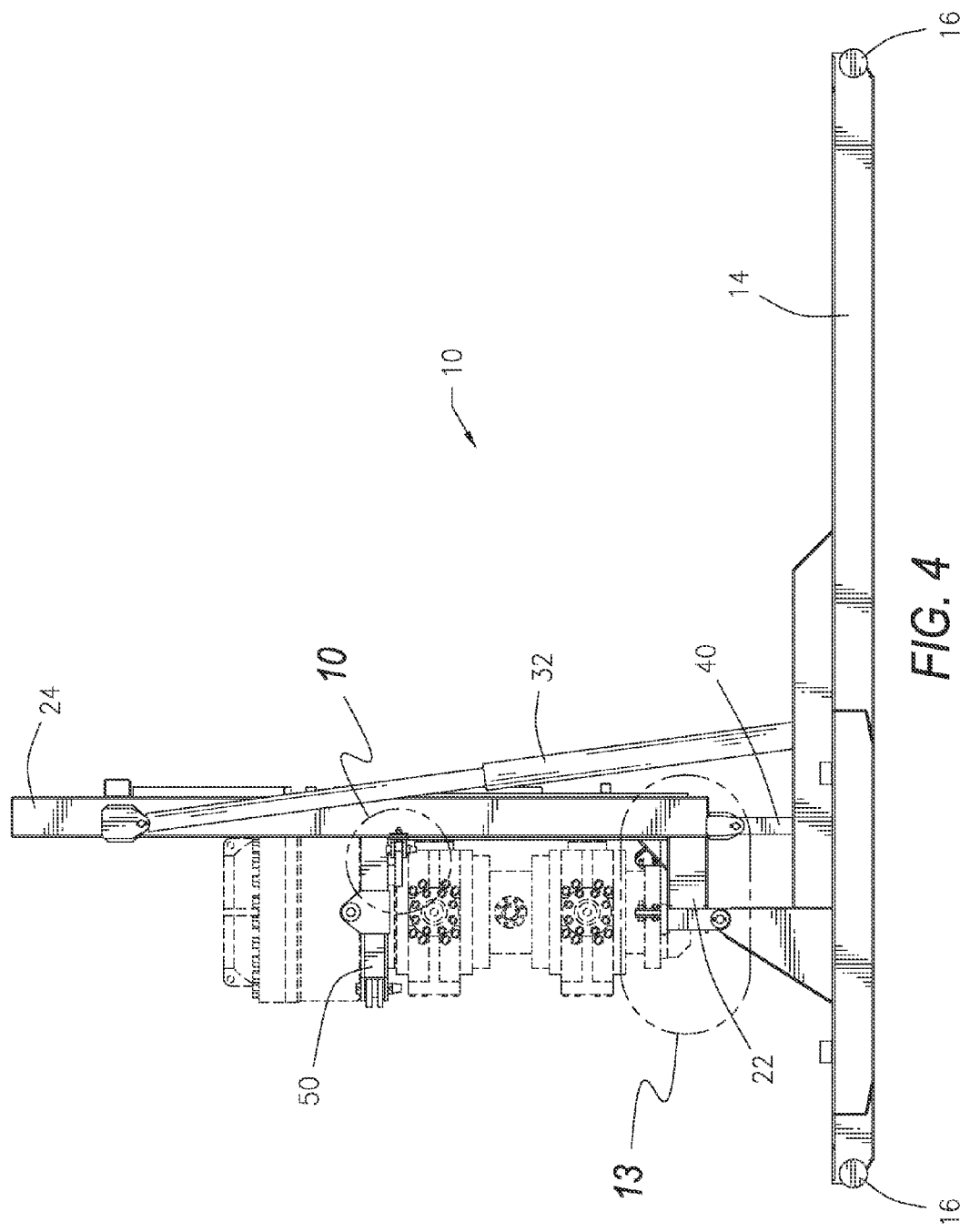
FIG. 4 illustrates a side view of a storage, transport and lift skid assembly shown in the vertical installation position.

A plurality of flange locks 34 are attached to the base portion 22 of the mounting frame 20. The flange locks 34 are spaced in an annular pattern around the base portion 22. FIG. 13 illustrates an enlarged portion of FIG. 4 showing a pair of the flange locks 34. Each flange lock 34 includes a pair of opposed plates spaced from each other and a flange finger therebetween. The flange fingers are pinned in place to retain the blowout preventer 12 to the base portion 22 of the mounting frame. The flange fingers are capable of engaging an annular base of the blowout preventer 12 to secure it into position.

FIGS. 14 and 15 illustrate two alternate flange fingers 36 and 38 apart from the flange locks 34. Depending on the particular blowout preventer 12 to be stored, transported and delivered, different sized flange fingers may be utilized. Accordingly, the assembly of the present invention may be adapted to various sizes and types of blowout preventers.

FIG. 4 illustrates a side view of the assembly 10 shown in the vertical installation position. The pair of hydraulic cylinders 32 are actuated to move the blowout preventer from the horizontal position. Although hydraulic cylinders are utilized in the present embodiment, it will be appreciated that pneumatic cylinders or another mechanism may be employed within the spirit and scope of the invention.

Once the hydraulic cylinders 32 have moved the mounting frame 20 to the vertical installation position, a pair of connecting links 40 pivotally connected to the base portion 22 of the mounting frame 20 will be rotated into position and then pinned to the base frame 14 to lock the mounting frame 20 into a vertical position. The connecting links 40 are shown locked in place in FIG. 4.

The assembly 10 also includes an adjustable blowout preventer cradle 50 which is adjustably connected to the back portion 24 of the mounting frame 20. The adjustable cradle 50 may be secured to the back portion by a pair of adjustable brackets 48. Depending on the height of the blowout preventer 12, the attachment of the brackets 48 to the back portion of the mounting frame 20 may be varied.

Figure 6:
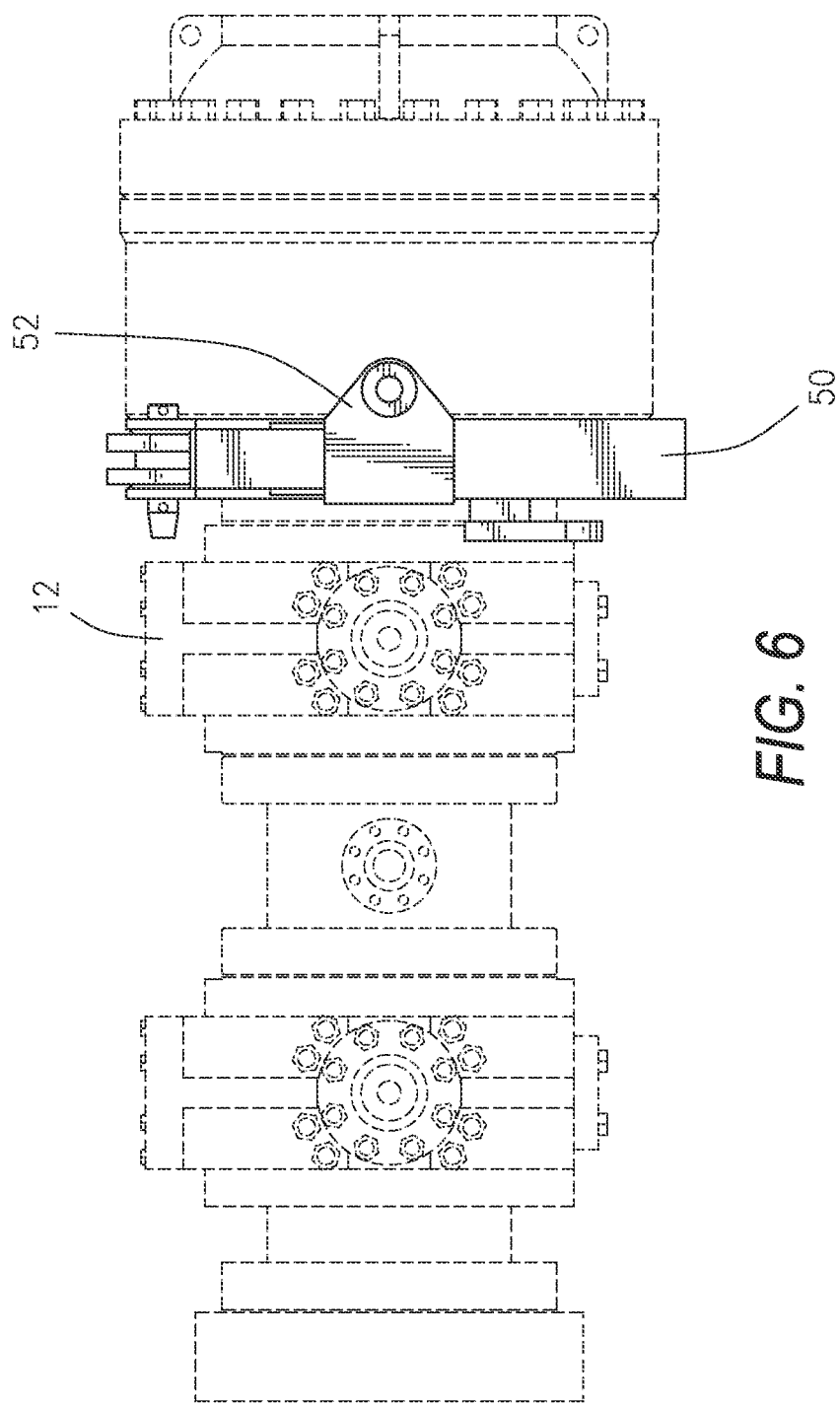
FIG. 6 illustrates a blowout preventer cradle of the assembly installed on a blowout preventer (shown in dashed lines)

FIG. 6 illustrates the adjustable cradle 50 shown surrounding a blowout preventer 12 (shown in dashed lines) apart from the assembly 10. The cradle 50 surrounds the circumference of the blowout preventer 12.

Figure 7:
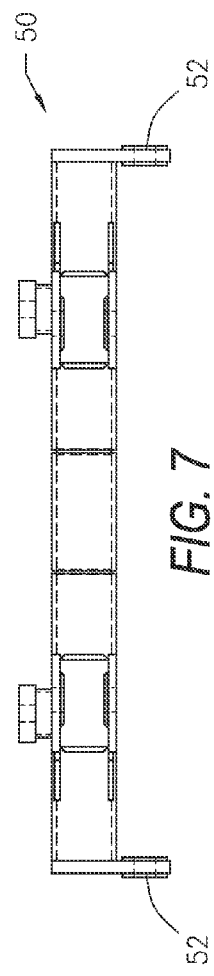
FIGS. 7, 8 and 9 illustrate alternate views of the blowout preventer cradle shown in FIG. 6.
Figure 9:
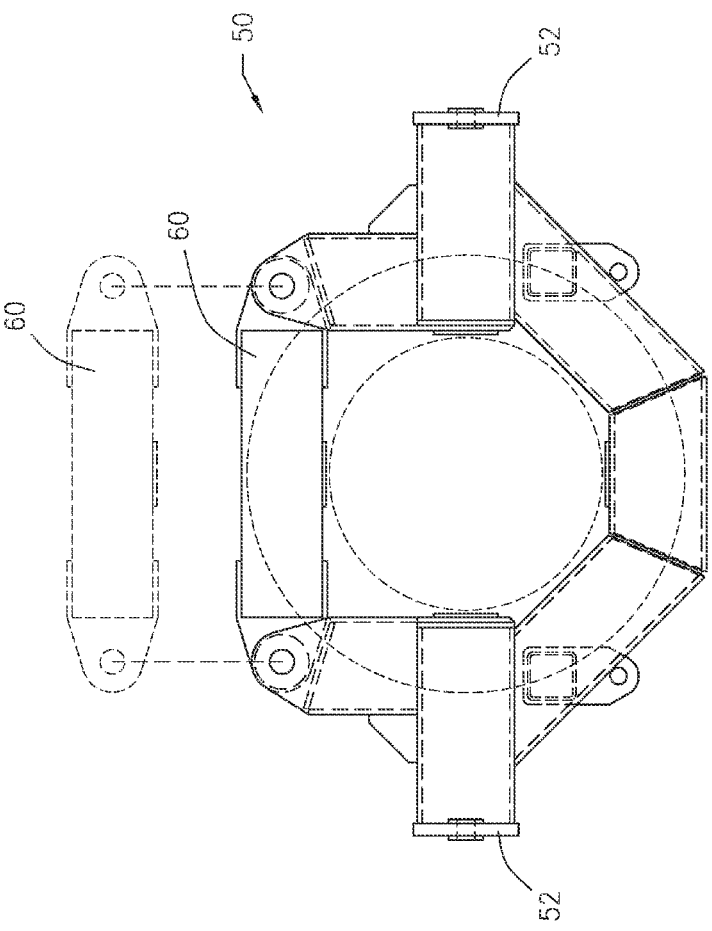
Figure 8:
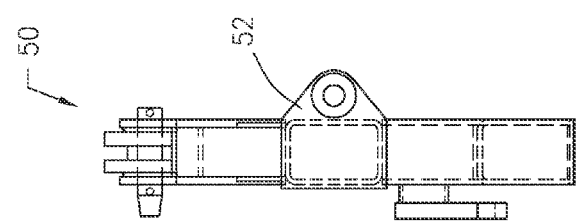

FIGS. 7, 8 and 9 show alternate views of the adjustable cradle 50. FIGS. 7 and 8 show the cradle 50 apart from the blowout preventer.

FIG. 10 is an enlarged view of a portion taken from FIG. 4 showing the adjustable brackets 48 which secure the cradle 50 to the back portion of the mounting frame 20.

FIGS. 11 and 12 show alternate, exploded views of the adjustable bracket 48 apart from the cradle 50. Each bracket 48 includes a pair of parallel ears having aligned holes therethrough to receive a pin 44 (seen in FIG. 10) to retain the bracket 48 to the cradle 50.

Fasteners 46 may be utilized to connect the brackets 48 to the back portion 24 of the mounting frame 20.

Returning to a consideration of FIGS. 7, 8 and 9, the cradle 50 also includes a pair of opposed projecting ears 52. Each of the ears 52 includes an opening therethrough.

Figure 5:
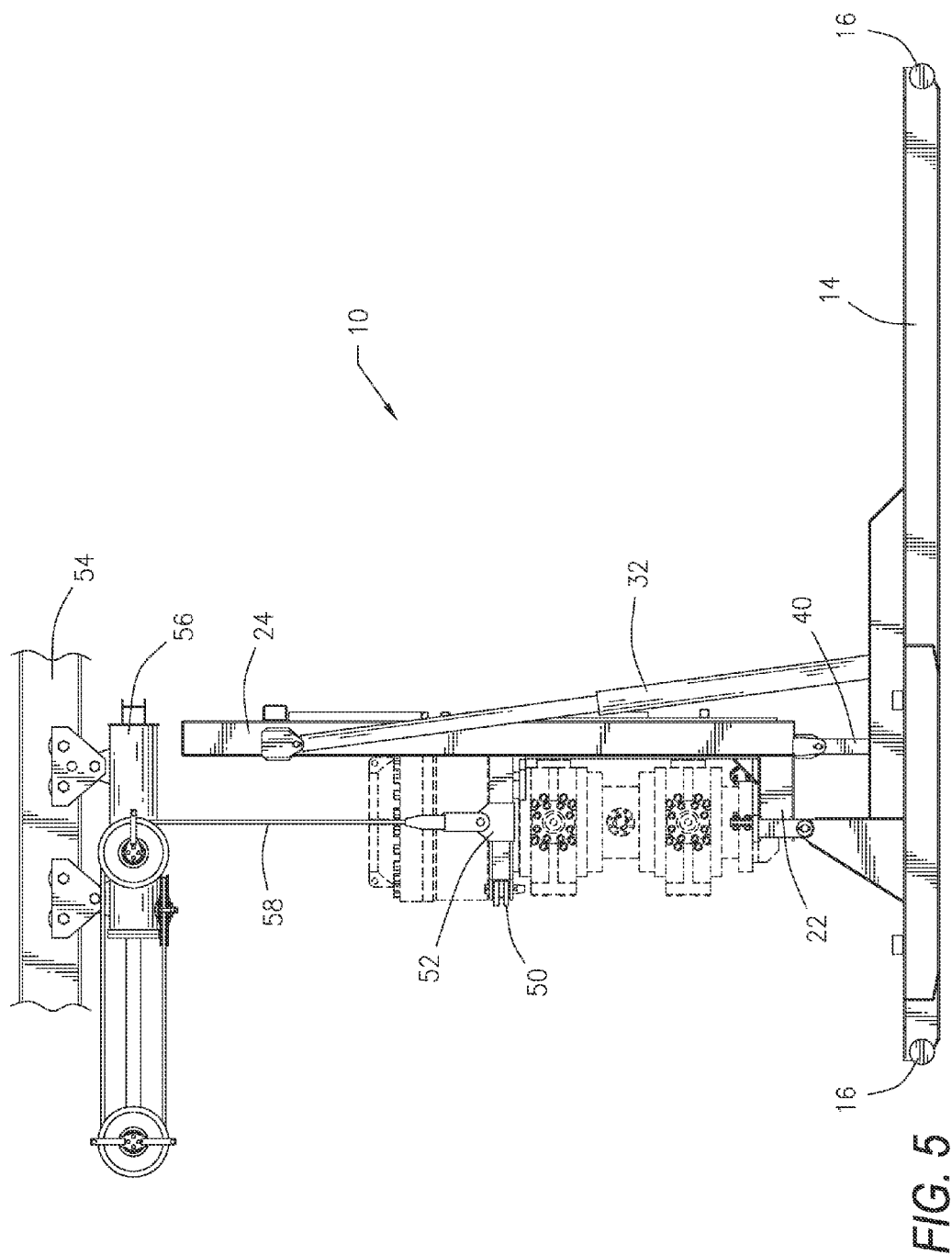
FIG. 5 illustrates a side view of the storage, transport and lift skid assembly shown in FIG. 4 beneath a drill or rig floor (partially cut away)

FIG. 5 illustrates a side view of the assembly 10 in the vertical position adjacent a drilling or rig floor 54 (a portion of which is shown) having a trolley 56 and a pair of cables 58. A shackle with a pin or other connecting mechanism will connect to each ear 52 on the cradle. The shackle, in turn, may be connected to cables or wire lines.

Once the blowout preventer is in a vertical position, it may be moved off the assembly. The flange locks 34 are detached from the base of the blowout preventer 12. The cradle 50 can be detached from the back portion of the mounting frame 20. A lift mechanism may be utilized to lift the blowout preventer 12 from the assembly 10 and move it in place over a well center line (not shown).

The cradle 50 includes a gate 60 which may be unpinned from the adjustable cradle 50 and removed for insertion and removal of the blowout preventer 12. In the event that a blowout preventer with a smaller diameter is utilized, an optional filler (not shown) may be inserted.

FIG. 9 illustrates the gate 60 pinned to the cradle 50 with the gate 60 also shown in dashed lines exploded therefrom.

In certain applications, the cradle 50 may remain installed on the blowout preventer 12 during operation with the well. In other applications, the cradle will be removed during operation with the well.

The present invention provides an efficient mechanism to store and transport a blowout preventer as well as move the blowout preventer for installation at the well site. A single assembly will accommodate multiple types and sizes of blowout preventers.

Whereas, the present invention has been described in relation to the drawings attached hereto, it should be understood that other and further modifications, apart from those shown or suggested herein, may be made within the spirit and scope of this invention.

What is claimed is:

1. A storage, transport and lift skid assembly for a blowout preventer, which comprises:
   a base frame;
   a mounting frame movable between a storage and transport position substantially parallel to said base frame and an installation position substantially perpendicular to said base frame;
   an adjustable blowout preventer cradle to retain said blowout preventer in said mounting frame;
   at least one pivot pin to permit rotation of said mounting frame with respect to said base frame;
   a plurality of flange locks adjustably connected to said mounting frame to secure to said blowout preventer, wherein each of said plurality of flange locks includes a flange finger capable of engaging a base of said blowout preventer; and
   at least one actuator mechanism to move said mounting frame between said storage and transport position and said installation position.

2. A storage, transport and lift skid assembly as set forth in claim 1 wherein said mounting frame includes a base portion and a back portion substantially perpendicular thereto.

3. A storage, transport and lift skid assembly as set forth in claim 2 including at least one adjustable bracket attachable to said back portion.

4. A storage, transport and lift skid assembly as set forth in claim 3 wherein said adjustable blowout preventer cradle is removably pinned to said back portion.

5. A storage, transport and lift skid assembly as set forth in claim 1 wherein said base frame includes a pair of upstanding legs and said at least one pivot pin includes a pair of pivot pins passing through said legs and through said mounting frame.

6. A storage, transport and lift skid assembly as set forth in claim 1 wherein said base frame includes a skid receivable on a tractor trailer.

7. A storage, transport and lift skid assembly as set forth in claim 1 wherein said at least one actuator mechanism includes a pair of hydraulic cylinders pivotally connected and extending between said base frame and said mounting frame.

8. A storage, transport and lift skid assembly as set forth in claim 2 including at least one pivoting link rotatably connected to said base portion of said mounting frame wherein said at least one pivoting link is capable of being connected to said base portion of said mounting frame when said mounting frame is in said installation position.

9. A storage, transport and lift skid assembly as set forth in claim 1 wherein said blowout preventer cradle includes a removable gate to secure said blowout preventer to said cradle.

10. A storage, transport and lift skid assembly as set forth in claim 1 wherein said blowout preventer cradle includes at least one lift connection mechanism.

11. A storage, transport and lift skid assembly as set forth in claim 10 wherein said at least one lift connection mechanism includes a pair of extending ears, each of said extending ears including an opening therethrough to engage with a lift mechanism.

12. A method to store, transport and install a blowout preventer, which method comprises:
    retaining a blowout preventer in a mounting frame with an adjustable blowout preventer cradle;
    securing said blowout preventer to said mounting frame with a plurality of flange locks, wherein each of said plurality of flange locks includes a flange finger capable of engaging a base of said blowout preventer;
    permitting rotation of said mounting frame with respect to a base frame about at least one pivot pin; and
    moving said mounting frame between a storage and transport position substantially parallel to said base frame and an installation position substantially perpendicular to said base frame with at least one actuator mechanism.

13. A method to store, transport and install a blowout preventer as set forth in claim 12 including the additional step of lifting said blowout preventer with a lift mechanism connected to said blowout preventer cradle at a lift connection mechanism.

14. A storage, transport and lift skid assembly for a blowout preventer, which comprises:
    a base frame;
    a mounting frame movable between a storage and transport position substantially parallel to said base frame and an installation position substantially perpendicular to said base frame;
    an adjustable blowout preventer cradle to retain said blowout preventer in said mounting frame, said blowout preventer cradle having at least one lift connection mechanism including a pair of extending ears, each of said extending ears including an opening therethrough to engage a lift mechanism;
    at least one pivot pin to permit rotation of said mounting frame with respect to said base frame;
    a plurality of flange locks adjustably connected to said mounting frame to secure to said blowout preventer; and
    at least one actuator mechanism to move said mounting frame between said storage and transport position and said installation position.

15. A storage, transport and lift skid assembly as set forth in claim 14 wherein said mounting frame includes a base portion and a back portion substantially perpendicular thereto.

16. A storage, transport and lift skid assembly as set forth in claim 15 including at least one adjustable bracket attachable to said back portion.

17. A storage, transport and lift skid assembly as set forth in claim 14 wherein each of said plurality of flange locks includes a flange finger capable of engaging a base of said blowout preventer.

\* \* \* \* \*